US011854562B2

(12) United States Patent
Zhang et al.

(10) Patent No.: US 11,854,562 B2
(45) Date of Patent: Dec. 26, 2023

(54) HIGH-QUALITY NON-PARALLEL MANY-TO-MANY VOICE CONVERSION

(71) Applicant: International Business Machines Corporation, Armonk, NY (US)

(72) Inventors: Yang Zhang, Cambridge, MA (US); Shiyu Chang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 16/411,614

(22) Filed: May 14, 2019

(65) Prior Publication Data

US 2020/0365166 A1 Nov. 19, 2020

(51) Int. Cl.
*G10L 21/003* (2013.01)
*G10L 21/013* (2013.01)
*G10L 19/00* (2013.01)
*G06N 20/20* (2019.01)
*G06N 3/08* (2023.01)
*G06N 3/045* (2023.01)

(52) U.S. Cl.
CPC ............ *G10L 21/013* (2013.01); *G06N 3/045* (2023.01); *G06N 3/08* (2013.01); *G06N 20/20* (2019.01); *G10L 19/00* (2013.01); *G10L 2021/0135* (2013.01)

(58) Field of Classification Search
CPC ..... G10L 15/063; G10L 15/065; G10L 15/07; G10L 15/16; G10L 2021/0135; G10L 21/003; G10L 25/30
See application file for complete search history.

(56) References Cited

U.S. PATENT DOCUMENTS

| 8,484,022 B1* | 7/2013 | Vanhoucke ......... G10L 19/0018 |
| | | 704/240 |
| 9,343,060 B2* | 5/2016 | Villavicencio ........ G10L 21/003 |
| 9,613,620 B2* | 4/2017 | Agiomyrgiannakis ..................... |
| | | G10L 15/07 |
| 9,721,559 B2 | 8/2017 | Cui et al. |

(Continued)

FOREIGN PATENT DOCUMENTS

CN 108777140 A 11/2018

OTHER PUBLICATIONS

Gao et al, "Nonparallel emotional speech conversion", Nov. 2018, arXiv preprint arXiv:1811.01174. Nov. 3, 2018, pp. 1-5.*

(Continued)

*Primary Examiner* — Olujimi A Adesanya
(74) *Attorney, Agent, or Firm* — Peter Edwards; McGinn I.P. Law Group, PLLC

(57) ABSTRACT

A method (and structure and computer product) to permit zero-shot voice conversion with non-parallel data includes receiving source speaker speech data as input data into a content encoder of a style transfer autoencoder system, the content encoder providing a source speaker disentanglement of the source speaker speech data by reducing speaker style information of the input source speech data while retaining content information and receiving target speaker input speech as input data into a target speaker encoder. The output of the content encoder and the target speaker encoder are combined in a decoder of the style transfer autoencoder, and the output of the decoder provides the content information of the input source speech data in a style of the target speaker speech information.

13 Claims, 11 Drawing Sheets

(56) References Cited

U.S. PATENT DOCUMENTS

| | | | |
|---|---|---|---|
| 10,068,557 B1* | 9/2018 | Engel | G10H 7/10 |
| 10,176,811 B2 | 1/2019 | Xue | |
| 10,186,251 B1* | 1/2019 | Mohammadi | G10L 13/0335 |
| 10,658,005 B1* | 5/2020 | Bogan, III | G10L 21/003 |
| 10,783,875 B2* | 9/2020 | Hosseini-Asl | G10L 15/063 |
| 10,971,142 B2* | 4/2021 | Sriram | G10L 15/20 |
| 10,977,439 B2* | 4/2021 | Mishra | G06N 3/088 |
| 2010/0198600 A1* | 8/2010 | Masuda | G10L 13/033 704/E21.001 |
| 2018/0012613 A1* | 1/2018 | Sun | G10L 25/24 |
| 2018/0277096 A1* | 9/2018 | Li | G06N 3/08 |
| 2019/0051314 A1* | 2/2019 | Nakashika | G10L 21/003 |
| 2019/0189115 A1* | 6/2019 | Hori | G10L 15/183 |
| 2019/0304480 A1* | 10/2019 | Narayanan | G06N 3/0472 |
| 2019/0318726 A1* | 10/2019 | Jin | G06N 3/0481 |
| 2020/0066260 A1* | 2/2020 | Hayakawa | G10L 15/16 |
| 2020/0110797 A1* | 4/2020 | Melnyk | G06F 40/30 |
| 2020/0395028 A1* | 12/2020 | Kameoka | G06N 3/0445 |
| 2020/0410976 A1* | 12/2020 | Zhou | G06N 3/08 |

OTHER PUBLICATIONS

Liu et al, "Voice Conversion Across Arbitrary Speakers Based on a Single Target-Speaker Utterance", Sep. 2018, In Interspeech 2018 (pp. 496-500).*

Chou et al, Multi-target voice conversion without parallel data by adversarially learning disentangled audio representations, Apr. 2018, arXiv preprint arXiv:1804.02812. Apr. 9, 2018, pp. 1-6.*

Kameoka et al, "ConvS2S-VC: Fully convolutional sequence-to-sequence voice conversion", Nov. 2018, arXiv preprint arXiv:1811.01609. Nov. 5, 2018, pp. 1-15.*

Jia et al, "Transfer learning from speaker verification to multispeaker text-to-speech synthesis", Jun. 2018, arXiv preprint arXiv:1806.04558. Jun. 12, 2018, pp. 1-11.*

Lorenzo-Trueba et al, "The voice conversion challenge 2018: Promoting development of parallel and nonparallel methods", Apr. 2018, arXiv preprint arXiv:1804.04262. Apr. 12, 2018., pp. 1-10.*

Hsu et al, "Voice conversion from non-parallel corpora using variational auto-encoder", 2016, In 2016 Asia-Pacific Signal and Information Processing Association Annual Summit and Conference (APSIPA) Dec. 13, 2016 (pp. 1-6).*

Shwartz-Ziv et al, "Opening the black box of deep neural networks via information", 2017, arXiv preprint arXiv:1703.00810. Mar. 2, 2017, pp. 1-19.*

Swietojanski et al, "Convolutional neural networks for distant speech recognition", 2014, IEEE Signal Processing Letters. May 20, 2014;21(9):1120-4.*

Skerry-Ryan et al, "Towards end-to-end prosody transfer for expressive speech synthesis with tacotron", Jul. 2018, . Ininternational conference on machine learning Jul. 3, 2018 (pp. 4693-4702). PMLR.*

Kim et al, "Bandwidth extension on raw audio via generative adversarial networks", Mar. 2019, arXiv preprint arXiv:1903.09027. Mar. 21, 2019, pp. 1-10.*

Li et al, "Many-to-many voice conversion based on bottleneck features with variational autoencoder for non-parallel training data", , Nov. 2018, In2018 Asia-Pacific Signal and Information Processing Association Annual Summit and Conference (APSIPA ASC) Nov. 12, 2018 (pp. 829-833). IEEE.*

Mohammadi et al, "Siamese Autoencoders for Speech Style Extraction and Switching Applied to Voice Identification and Conversion", 2017, InINTERSPEECH 2017 (pp. 1293-1297). (Year: 2017).*

Lorenzo-Trueba, "The voice conversion challenge 2018: Promoting development of parallel and nonparallel methods", Apr. 2018, arXiv preprint arXiv:1804.04262. Apr. 12, 2018. (Year: 2018).*

Zhou et al, "Voice conversion with conditional SampleRNN", Aug. 2018, arXiv preprint arXiv:1808.08311. Aug. 24, 2018, p. 1—(Year: 2018).*

Kobayashi et al, "sprocket: Open-Source Voice Conversion Software", Jun. 2018, InOdyssey Jun. 26, 2018 (pp. 1-9) (Year: 2018).*

Mel, et al. "The NIST Definition of Cloud Computing". Recommendations of the National Institute of Standards and Technology. Nov. 16, 2015.

Wu, Zhizheng, et al., "Improving Trajectory Modelling for DNN-Based Speech Synthesis by Using Stacked Bottleneck Features and Minimum Generation Error Training," IEEE/ACM Transactions on Audio, Speech, and Language Processing 24.7 (2016): 1255-1265.

Zhou, Cong, et al., "Voice Conversion with Conditional SampleRNN," arXiv.org, arXiv:1808.08311, Aug. 24, 2018, 5 pages.

Hashimoto, Tetsuya, et al., "Many-to-many and Completely Parallel-Data-Free Voice Conversion Based on Eigenspace DNN," IEEE/ACM Transactions on Audio, Speech, and Language Processing 27.2 (2019): 332-341.

* cited by examiner

100

Generative Adversarial Network (GAN)

Pro: Distribution matching property
Con: Extremely hard to train

102

Conditional Variational Autoencoder (CVAE)

Pro: Very easy to train
Con: Unable to model complex distributions

Autoencoder Style Transfer

Conversion / Training

Speech Reconstruction Loss + Content Reconstruction Loss — 302

$$\mathbb{E}\left[\|\hat{X}_{1\to 1} - X_1\|_2^2 + \lambda \|E_c(\hat{X}_{1\to 1}) - C_1\|_1\right]$$

If bottleneck dimension is appropriately set, then the global minimizer of the loss would asymptotically satisfy the ideal conversion properties as $T \to \infty$.

If the bottleneck is too wide:
1. Perfect reconstruction is possible
2. $C_1$ contains both content and speaker information If the bottleneck is too narrow:
Content information is lost, so perfect reconstruction is not possible If the bottleneck is just right:
1. Perfect reconstruction is possible
2. $C_1$ contains both only content information – speaker disentanglement If the bottleneck is just right:
1. Perfect reconstruction is possible
2. $C_1$ contains both only content information & speaker disentanglement During the actual conversion, the output should contain no source speaker information.

If self-reconstruction sounds good, then conversion sounds good.

HIGH-QUALITY NON-PARALLEL MANY-TO-MANY VOICE CONVERSION

BACKGROUND

The present invention relates generally to voice conversion. More specifically, an autoencoder with a specifically-designed bottleneck permits removal of style information from a source voice to permit a zero-shot voice conversion.

The idea of speaking in someone else's voice never fails to be a fascinating element in action and fiction movies, and it also finds its way into many practical applications, for example, privacy and identity protection, the creative industry, etc. In the speech research community, this task is referred to as the voice conversion problem, which involves modifying a given speech from a source speaker to convert its vocal qualities with those of a target speaker, thereby permitting the source speaker utterances to sound more as if the target speaker is actually making the utterances.

Despite the continuing research efforts in voice conversion, three problems remain under-explored. First, most voice conversion systems assume the availability of parallel training data, for example, speech pairs where the two speakers utter the same sentences. Only a few can be trained on non-parallel data. Second, among the few existing algorithms that work on non-parallel data, even fewer can work for many-to-many conversion, for example, converting from multiple source speakers to multiple target speakers. And last but not least, until the present invention, no voice conversion systems have been able to perform zero-shot conversion, as meaning a conversion to the voice of an unseen speaker by looking at only one or a few of his/her utterances.

SUMMARY

The present invention provides the first known method of achieving zero-shot conversion.

In accordance with an exemplary embodiment, the present invention discloses a method (and apparatus and computer product) of voice conversion capable of a zero-shot voice conversion with non-parallel data, including receiving source speaker speech data as input data into a content encoder of a style transfer autoencoder system, the content encoder providing a source speaker disentanglement of the source speaker speech data by reducing speaker style information of the input source speech data while retaining the content information. Target speaker input speech is received as input data into a target speaker encoder, and an output of the content encoder and an output of the target speaker encoder are combined as input data into a decoder of the style transfer autoencoder, and an output of the decoder provides the content information of the input source speech data as adapted to a style of the target speaker.

In accordance with another exemplary embodiment, also disclosed herein is a style transfer autoencoder system (and method and computer product) including a processor; and a memory accessible to the processor that stores machine-readable instructions permitting the processor to implement the style transfer autoencoder system as including a content encoder for receiving source speech information, a target speaker encoder for receiving target speaker speech information, and a decoder receiving output data from the content encoder and output data from the target speaker encoder, the decoder providing as output speech information as comprising a content of a source speech utterance in a style of the target speaker. The content encoder is configured with parameter settings in a dimension axis and in a temporal axis so as to achieve a speaker disentanglement of the received source speech information, where speaker disentanglement means that a style aspect of a source speech utterance is reduced by a bottleneck caused by the parameter settings, leaving thereby a content aspect of the source speech utterance to be input data into the decoder.

In accordance with yet another exemplary embodiment, also disclosed herein is a method (and apparatus and computer product) for transferring a style of voice utterances, as capable of a zero-shot voice conversion with non-parallel data, including preliminarily training a first neural network in a target speaker encoder, using speech information of a target speaker. The first neural network is trained to maximize an embedding similarity among different utterances of the target speaker and minimize similarities with other speakers. An autoencoder system is operated first in a training mode, the autoencoder system including a content encoder having a second neural network that compresses original input data from an input layer into a shorter code and a decoder having a third neural network that learns to un-compress the shorter code to closely match the original input data. The training mode implements a self-reconstruction training using speech inputs from a source speaker into the content encoder and into the target speaker encoder that has been preliminarily trained using target speaker speech information. The self-reconstruction training thereby trains the second neural network and the third neural network to adapt to a style of the target speaker. After the training mode, the autoencoder system can be operated in a conversion mode in which utterances of a source speaker provide source speech utterances in a style of the target speaker.

DETAILED DESCRIPTION

Figure 1:
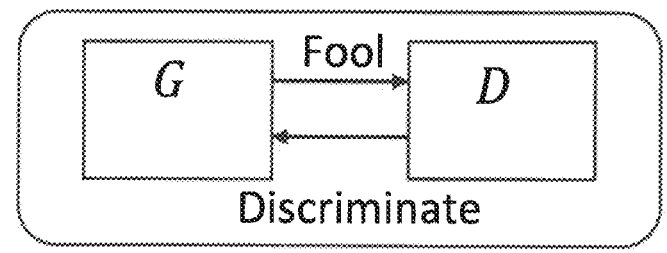
FIG. 1 generically shows the Generative Adversarial Network (GAN) and Conditional Variational Autoencoder (CVAE)
Figure 1:
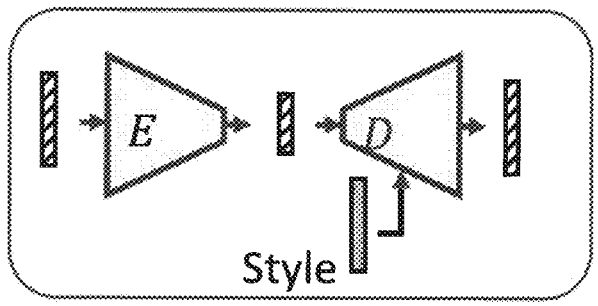

With the recent advances in deep style transfer, the traditional voice conversion problem is being recast as a style transfer problem, where the vocal qualities can be regarded as styles, and speakers as domains. There are various style transfer algorithms that do not require parallel data, and are applicable to multiple domains, so they are readily available as new solutions to voice conversion. In particular, Generative Adversarial Network (GAN) 100 and Conditional Variational Autoencoder (CVAE) 102, are gaining popularity in voice conversion, as shown in FIG. 1.

First, the GAN system 100 is well known in the art as a class of machine learning systems in which two neural network contest each other in a zero-sum game framework, as a form of unsupervised learning. The GAN technique began as a technique in which photographs can be generated that look at least superficially authentic to a human observer by having at least some realistic characteristics. A GAN is implemented by using a first generative network to generate candidates while a second discriminative network evaluates the candidates, and the contest operates in terms of data distributions. The generative network learns to map from a latent space to a data distribution of interest, while the discriminative network distinguishes candidates produced by the generator from the true data distribution. The "Fool/Discriminate" symbology of FIG. 1 is intended as referring to the training objective of the generative network to increase the error rate of the discriminative network. That is, the generative network GAN component G attempts to "fool" the discriminator network component D by producing novel candidates that the discriminator neural network determines as not synthesized, meaning that they are part of the true data distribution.

A generator G of a GAN system trains based on whether the generator succeeds in fooling the discriminator D. A generator is typically seeded with randomized input that is sampled from a predefined latent space and thereafter candidates synthesized by the generator are evaluated by the discriminator, and backpropagation is applied in both the generative network and the discriminator network. The result is that the generator network learns to produce better images while the discriminator learns to better flag synthetic images. In a GAN system, the generator neural network G is typically a deconvolutional neural network, and the discriminator neural network D is typically a convolutional neural network The CVAE system 102 of FIG. 1 uses a neural network E as an encoder and a neural network D as a decoder. The autoencoder compresses input data from the input layer into a short code using the encoder E, and the decoder D learns to un-compress that code into something that closely matches the original data. This un-compressing occurs by copying data in the upsampling stages in the decoder such that data is filled into additional channels using a systematic alternation of channels, as exemplarily shown in the insets in the lower right corner of FIG. 8. Backpropagation is used during the learning stage of the decoder to adapt the neural network in the decoder D to attempt to match the original data provided as input into the encoder E.

However, neither of the GAN and CVAE approaches is perfect. GAN 100 comes with a nice theoretical justification that the generated data would match the distribution of the true data, and has achieved state-of-the-art results, particularly in computer vision. However, it is widely acknowledged that GAN is very hard to train, and its convergence property is fragile. Also, although there is an increasing number of works that introduce GAN to speech generation, there is no strong evidence that the generated speech sounds real since speech that is able to fool the discriminators has yet to fool human ears.

On the other hand, CVAE 102 is easier to train. All it needs to do is to perform self-reconstruction and maximize a variational lower bound of the output probability. The intuition is to infer a hypothetical style-independent hidden variable, which is then combined with the new style information to generate the style-transferred output. However, CVAE alone does not guarantee distribution matching, and often suffers from over-smoothing of the conversion output.

Due to the lack of a suitable style transfer algorithm, existing voice conversion systems have yet to produce satisfactory results, which naturally leads to the following question: Is there a style transfer algorithm that is also theoretically proven to match the distribution as GAN is, and that trains as easily as CVAE, and that works better for speech?

Motivated by this question, the present invention presents a new scheme for style transfer, which involves only a vanilla autoencoder, but which uses a carefully designed bottleneck. Similar to CVAE, the proposed scheme only needs to be trained on the self-reconstruction loss, but it has a distribution matching property similar to GAN's. This is because the correctly-designed bottleneck of the present invention learns to reduce information which corresponds to the style information from the source to get the style-independent code (i.e., extracts the content from the source speech by removing the source speaker's style), which is the goal of CVAE, but which the training scheme of CVAE has been unable to guarantee. By designing the bottleneck as described herein, the present invention has discovered a style transfer system that provides zero-shot voice conversion capability.

The present inventors refer to their new system as "AutoVC" (Auto Voice Conversion), as a many-to-many voice style transfer algorithm without parallel data and capable of zero-shot voice transfer.

Figure 2:
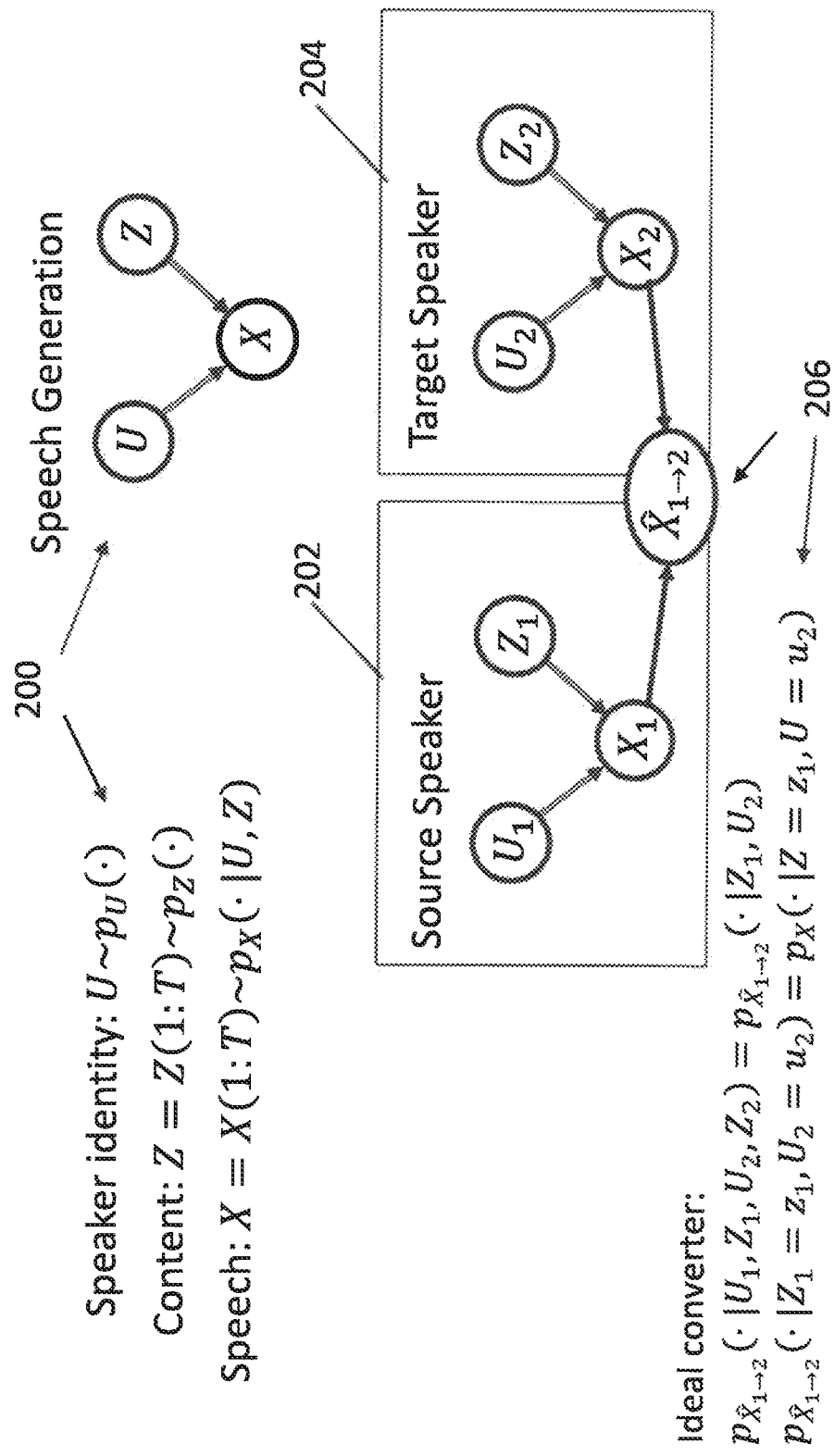
FIG. 2 diagrams the problem being solved by the present invention.

FIG. 2 shown diagrammatically the problem being addressed by the present invention in mathematical format, as involving random variables. Even though the intended application of the invention is voice conversion, this mathematical basis can be applicable to other style transfer applications as well. As shown exemplarily in FIG. 2, speech 200 is assumed to be generated as a stochastic process in which upper-case letters (e.g., speaker identity U, content Z, and speech X) denote random variables. Lower case variables (e.g., z) denote deterministic values or instances of a random variable, and the symbology X(1:T) denotes a random process, with (1:T) denoting a collection of time indices running from 1 to T. For notational ease, sometimes the time indices are omitted to represent the collection of the random process at all times. The symbology $p_X(\cdot|Y)$ denotes the probability mass function (PMF) or probability density function(PDF) of X conditional on Y; $p_X(\cdot|Y=y)$, or sometimes $p_X(\cdot|y)$ without causing confusion, denotes the PMF/PDF of X conditional on Y taking a specific value y; similarly, E[X|Y], E[X|Y=y], and E[X|y] denote the corresponding conditional expectations. H(·) denotes the entropy, and H(·|·) denotes the conditional entropy.

Mathematically, a speech utterance 200 can be assumed to be generated by a stochastic process in which, first, a speaker identity U is a random variable drawn from a speaker population $p_U(\cdot)$. Then a content vector Z=Z(1:T) is a random process drawn from the joint content distribution $p_Z(\cdot)$. Here, content refers to the phonetic and prosodic information. Finally, given the speaker identity and content, the speech segment X=X(1:T) is a random process randomly sampled from the speech distribution (i.e., $p_X(\cdot|U,Z)$, which characterizes the distribution of U's speech uttering the content Z. X(t) can represent a sample of speech waveform or a frame of speech spectrogram but the present invention involves the speech spectrogram. Additionally, it is assumed that each speaker produces the same amount of gross information, i.e., $H(X|U=u)=h_{speech}=$constant, regardless of u.

Now, assuming two sets of variables, $(U_1,Z_1,X_1)$ and $(U_2,Z_2,X_2)$, are independent and identically distributed (i.i.d) random samples generated from this process, where $(U_1,Z_1,X_1)$ belongs to the source speaker 202 and $(U_2,Z_2,X_2)$ belongs to the target speaker 204. The goal of the present invention is to design a speech converter 206 that produces the conversion output that preserves the content in $X_1$ but matches the speaker characteristics of speaker $U_2$. Formally, an ideal speech converter should have the following desirable property:

$$P_{\hat{X}_{1\rightarrow 2}}(\cdot|U_2=u_2,Z_1=z_1)=px(\cdot|U=u_2,Z=z_1),$$

This equation above means that, given the target speaker's identity $U_2=u_2$ and the content in the source speech $Z_1=z_1$, the conversion speech should sound as if the target speaker $u_2$ were uttering $Z_1$.

When $U_1$ and $U_2$ are both seen in the training set, the problem is a standard multi-speaker conversion problem, which has been previously addressed in the art. When $U_1$ or $U_2$ is not included in the training set, the problem becomes the more challenging zero-shot voice conversion problem, which is also a target task of the AutoVC of the present invention. This problem formulation can be extended to a general style transfer setting, where $U_1$ and $U_2$ can represent two domains and $X_1$ and $X_2$ can represent samples from their respective domains.

Figure 3:
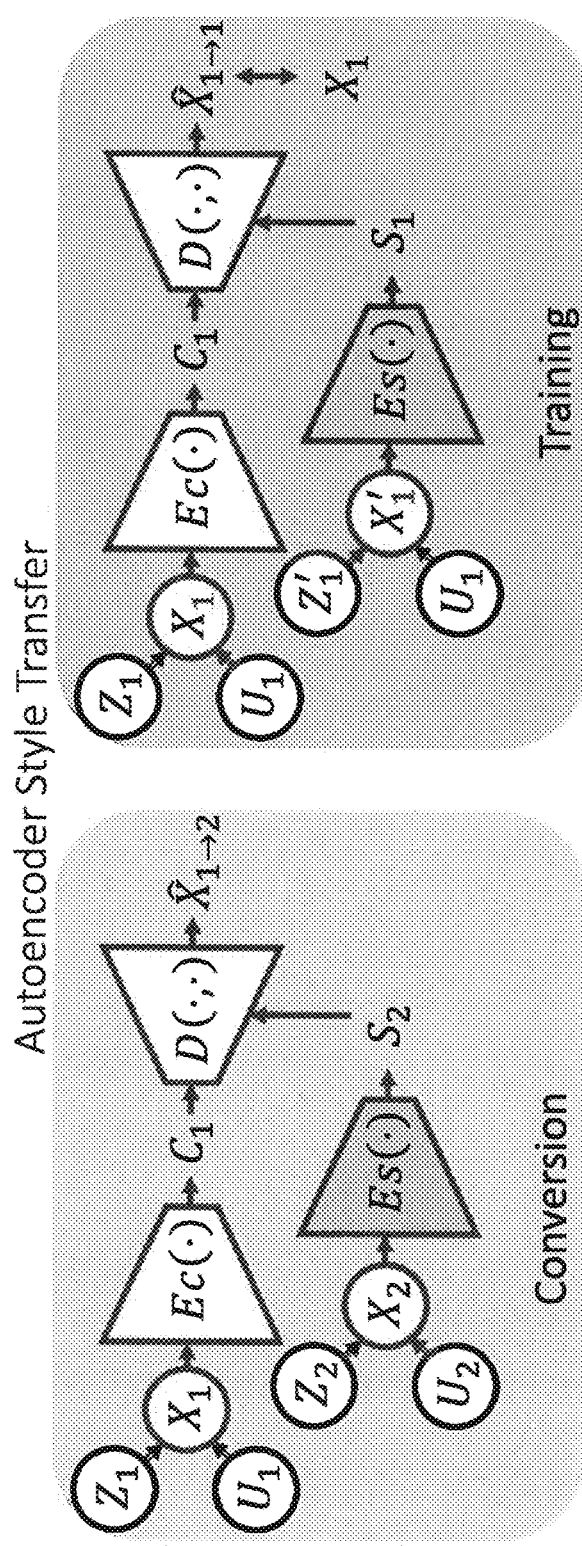
FIG. 3 exemplarily shows the autoencoder style transfer framework that is used in the present invention.

As shown in the high-level schematic in FIG. 3, the AutoVC of the present invention follows the generic auto-encoder framework shown exemplarily in the lower portion of FIG. 1. This very simple baseline encoder framework of AutoVC shown in FIG. 3 consists of three modules, a content encoder Ec(•) that produces a content embedding from speech, a speaker encoder Es(•) that produces a target speaker embedding from speech, and a decoder D(•,•) that produce speech from content and speaker embeddings, analogously serving to "mix" the target speaker's style onto the content of the source speech.

The circles in FIG. 3 denote the probabilistic graphical model of the speech generation process. The two Es (•) symbols represent a module referred to herein as a "speaker encoder" or "style encoder", which is a module that is pre-trained to extract a style vector S of an input speech into that module, where the style vector characterizes the voice quality of the input speaker. During conversion, shown on the left of FIG. 3, the source speech $X_1$ is fed to the content encoder $E_C(\cdot)$ to have content information extracted (i.e., by removing style from the input speech). An utterance of the target speaker $X_2$ is fed to the style encoder $E_S(\cdot)$, to provide target speaker style information. The decoder D(•,•) produces the converted speech based on the content information $C_1$ in the source speech and the style information $S_2$ in the target speech. Here, $C_1=E_C(X_1), S_2=E_S(X_2), \hat{X}_{1\rightarrow 2}=D(C_1,S_2)$, where $C_1$ and $\hat{X}_{1\rightarrow 2}$ are both random processes, and $S_2$ is simply a random vector. The output of the decoder D(•,•) is converted source speech in which content $C_1$ of speaker $U_1$ is converted in the style $S_2$ of the target speaker $U_2$ to sound as if target speaker $U_2$ is speaking the content $C_1$ of source speaker $U_1$.

Training of the AutoVC system is shown on the right side of FIG. 3. It is assumed that the speaker encoder Es(•) is already pre-trained to the speaker-dependent embeddings of the target speaker. Therefore, speaker encoder Es(•) is also considered a "style" encoder or a "target speaker encoder", since it has been trained for the speech characteristics of the target speaker. So by "training" the AutoVC, as shown in the right side of FIG. 3, this process means training of the content encoder $E_C(\cdot)$ and the decoder D(•,•). Additionally, as shown in FIG. 3, since parallel data is not assumed, only self-reconstruction is needed for training.

More specifically, during training shown on the right side of FIG. 3, the input the content encoder $E_C(\cdot)$ is still $U_1$, but the input to the style encoder $E_S(\cdot)$ becomes another speech drawn from the same speaker $U_1$ (uttering a different content $Z_1'$, denoted as $X_1'$). Then, for each input speech $X_1$, the AutoVC system learns to reconstruct itself (i.e., self-reconstruction), based on the style of the target speaker that is retained in the speaker encoder Es(•) that was pre-trained with characteristics of the target speaker:

$$C_1=E_C(X_1), S_1=E_S(X_1'), \hat{X}_{1\rightarrow 2}=D(C_1,S_1)$$

The loss function to minimize the weighted combination of the self-reconstruction error and the content code reconstruction error 302 shown in FIG. 3.

This simple training scheme is sufficient to produce the ideal distribution-matching voice conversion, as based on having a proper information bottleneck for the AutoVC. The mathematical theorem underlying this result is not recited herein since such mathematical basis is not required to understand and apply the present invention. Basically, the mathematics demonstrate that the bottleneck dimension of the content encoder $E_C(\cdot)$ needs to be set such that it is just enough to code the speaker independent information $S_2$. An intuitive explanation of the underlying mathematics is shown in FIGS. 4-6, keeping in mind the explanation for the CVAE Autoencoder in the lower part of FIG. 1, that the decoder D attempts during training to reconstruct the original input that the encoder E reduces during training.

Figure 4:
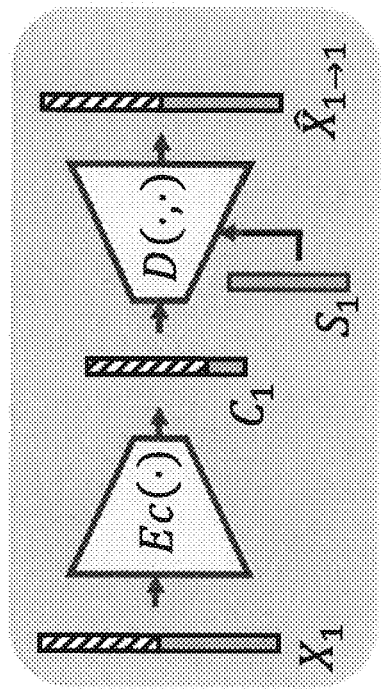
FIG. 4 exemplarily shows an autoencoder where the bottleneck is too wide in accordance with concepts of the present invention.
Figure 5:
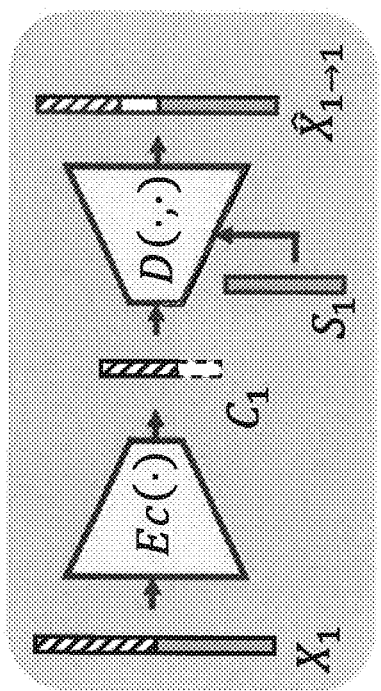
FIG. 5 exemplarily shows an autoencoder where the bottleneck is too narrow.

Thus, as shown beginning in FIG. 4, speech contains two types of information: the speaker information, shown in solid color, and the speaker-independent information, shown as striped, and which is referred to as the content information. If the bottleneck is very wide as shown in FIG. 4, even as wide as the input speech $X_1$. The most convenient way to do self-reconstruction is to copy $X_1$ as is to the content embedding $C_1$, and this will guarantee a perfect reconstruction. However, as the dimension $C_1$ decreases, $C_1$ is forced to lose some information. Since the autoencoder attempts to achieve perfect reconstruction, it will choose to lose speaker information because the speaker information is already supplied in $S_1$. In this case, perfect reconstruction is still possible, but the $C_1$ may contain some speaker information, as shown in FIG. 4.

On the other hand, if the bottleneck is very narrow, then the content encoder $E_C(\cdot)$ will be forced to lose so much information that not only the speaker information $S_1$ but also some of the content information $C_1$ is lost. In this case, the perfect reconstruction is impossible, as demonstrated in FIG. 5.

Figure 6:
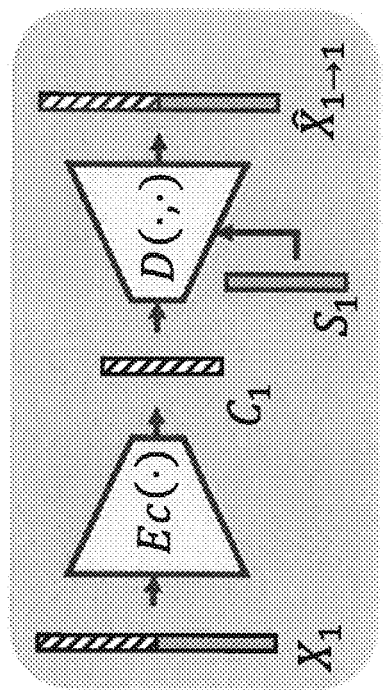
FIG. 6 exemplarily shows an autoencoder where the bottleneck is just right.

Therefore, as exemplarily shown in FIG. 6, when the dimension of the $C_1$ is chosen such that the dimension reduction is just enough to get rid of all the speaker information but no content information is harmed, the desirable condition is reached in which the following two properties hold:

1. Perfect reconstruction is achieved; and
2. The content embedding $C_1$ does not contain any information of the source speaker $U_1$, referred to herein as "speaker disentanglement."

Figure 7:
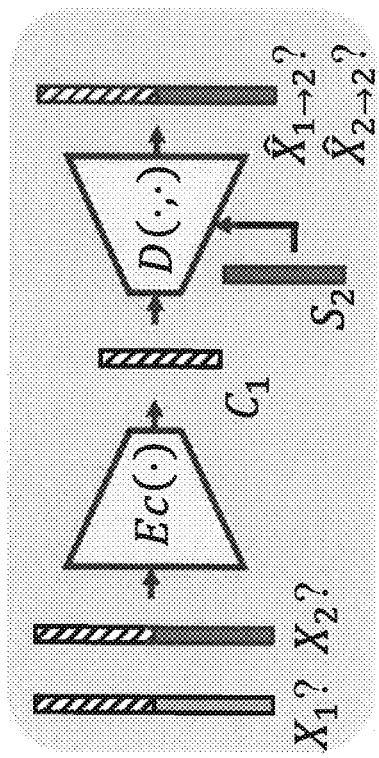
FIG. 7 exemplarily shows an autoencoder where the bottleneck is right and used for zero-shot voice transfer.

It can also be shown by contradiction how these two properties imply an ideal conversion, as follows. Suppose when AutoVC is performing an actual conversion (source and target speakers are different, as shown in the left side of FIG. 3), the quality is low, or does not sound like the target speaker at all. By property I above, we know that the reconstruction (source and target speakers are the same, shown in the right side of FIG. 3) quality is high. However, the output speech in the left side of FIG. 3 can only access $C_1$ and $S_2$, both of which do not contain any style information of the source speaker $U_1$. In other words, given the bottleneck presumed in FIG. 7, from the conversion output shown in the left side of FIG. 3, one can never tell if it is produced by self-reconstruction or conversion. Thus, as shown in FIG. 7, if self-construction sounds good, then conversion sounds good, as shown by label 702 in FIG. 7. If the conversion quality is low, but the reconstruction quality is high, one will be able to distinguish between conversion and reconstruction above chance, which leads to a contradiction.

Figure 8:
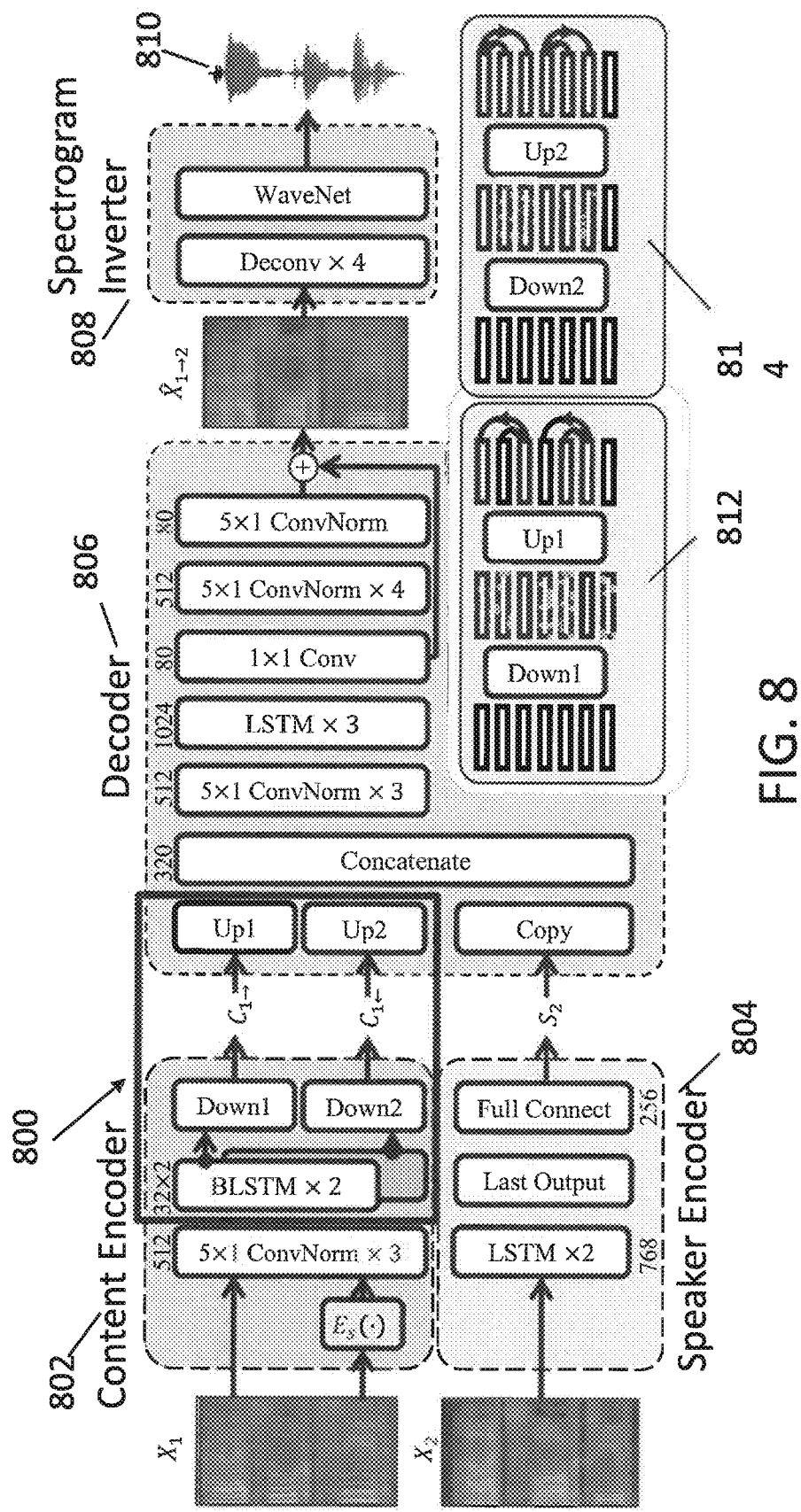
FIG. 8 shows an exemplary embodiment of the present invention as developed and tested for publication describing the invention.

FIG. 8 shows an exemplary embodiment of the AutoVC architecture as comprising three major modules: a content encoder 802, a speaker encoder 804, and a decoder 806. AutoVC works on the speech mel-spectrogram of size N-by-T, where N is the number of mel-frequency bins and T is the number of time steps (frames). A spectrogram inverter 808 is introduced to convert the output mel-spectrogram back to the waveform 810.

The bottleneck tuning of the present invention is represented by the contents of rectangle 800, and it is this tuning that permits the content decoder 802 to eliminate the style aspect of the source speech input $X_1$ while retaining the content aspect of the input speech $X_1$. Speaker encoder 804, also referred to herein as the style encoder, has been pre-trained to the speech embeddings of the target speaker, so that the output $S_2$ of the speaker encoder 804 provides style aspects of the target speaker when the AutoVC functions in the conversion mode.

The Content Encoder 802

The input to the content encoder 802 is the mel-spectrogram of $X_1$ concatenated with the speaker embedding, $E_S(X_1)$, at each time step. The concatenated features are fed into three 5×1 convolutional layers, each followed by batch normalization and Rectified Linear Unit (ReLU) activation. The number of channels is 512. The output then passes to a stack of two bidirectional Long Short-Term Memory (LSTM) layers. Both the forward and backward cell dimensions are 32.

As a key step of constructing the information bottleneck, both the forward and backward outputs of the bidirectional LSTM are downsampled by 32. The downsampling is performed differently for the forward and backward paths. For the forward output, the time steps $\{0, 32, 64, \ldots\}$ are kept; for the backward output, the time steps $\{31, 63, 95, \ldots\}$ are kept. Insets 812 and 814 also demonstrate how the downsampling is performed (for the ease of demonstration, the downsampling factor is set to 3). The resulting content embedding is a set of two 32-by-T/32 matrices, which are denoted $C1_\rightarrow$ and $C_\leftarrow$ respectively. The downsampling can be regarded as dimension reduction along the temporal axis, which, together with the dimension reduction along the channel axis, constructs the information bottleneck.

Thus, from this description and the example shown in FIG. 8, the bottleneck tuning that is the object of the present invention occurs in two dimensions: in the channel axis, the exemplary input channel dimension of 512 is reduced exemplarily to 32; and in the temporal axis, the downsampling is exemplarily set at 32.

Although the exemplary embodiment in FIG. 8 shows downsampling of 32, which is also equivalent to the a time factor of 32, these values are not limiting, since the method of the invention would be expected to function satisfactorily when downsampling is set at a value within a range of approximately between 32 to 64 and the time factor is set at a value approximately between 16 and 32.

The Speaker Encoder 804

The goal of the speaker encoder 804, also referred to herein as the style encoder or the target speaker encoder, is to produce the same embedding for different utterances of the same speaker, and different embeddings for different speakers. For conventional many-to-many voice conversion, the one-shot encoding of speaker identities suffices. However, in order to perform zero-shot conversion, it is necessary to apply an embedding that is generalizable to unseen speakers. Therefore, the speaker encoder 804 of the present invention follows a conventional design by Wan, et al., 2018, and includes a stack of two Long Short-Term Memory (LSTM) layers with cell size 768. Only the output of the last time is selected and projected down to dimension 256 with a fully connected layer. The resulting speaker embedding is a 256-by-1 vector. The speaker encoder is pre-trained on the soft-max loss version of the GE2E loss. The GE2E loss attempts to maximize the embedding similarity among different utterances of the same speaker and minimize the similarity among different speakers.

In an exemplary prototype implementation, the speaker encoder 804 was pre-trained on the combination of VoxCeleb1 and Librispeech corpora, wherein there are a total of 3549 speakers. Once the speaker encoder 804 has been trained to convey the style of the target speaker, the present invention provides zero-shot capability without having to be trained again for a zero-shot utterance.

The Decoder 806

The architecture of the decoder 806 is similar to that described by Shen, et al., 2018. First, the content and speaker embeddings are both upsampled by copying to restore to the original temporal resolution. Formally, denoting the upsampled features as $U_\rightarrow$ and $U_\leftarrow$, respectively, then $$U_\rightarrow(:, t) = C_1(:, \lfloor t/32 \rfloor)$$

$$U_\leftarrow(:, t) = C_{1\leftarrow}(:, \lfloor t/32 \rfloor)$$

where (:,t) denotes indexing the t-th column. The copying is demonstrated in insets 812, 814 in the lower right corner of FIG. 8, which shows exemplarily how copying occurs in different directions based on the different sampling periods. The underlying intuition is that each embedding at each time step should contain both past and future information. For the target speaker embedding, the vector is simply copied T times.

Then, the upsampled embeddings are concatenated and fed into three 5×1 convolutional layers with 512 channels, each followed by batch normalization and ReLU activation function, and then three LSTM layers with cell dimension 1024. The outputs of the LSTM layer are projected to dimension 80 with a 1×1 convolutional layer. This projection output is the initial estimate of the converted speech 816, denoted in FIG. 8 as $\hat{X}_{1\rightarrow 2}$.

In order to construct the fine details of the spectrogram better on top of the initial estimate, a post network is introduced after the initial estimate, as introduced in Shen, et al., 2018. The post network consists of five 5×1 convolutional layers, where batch normalization and hyperbolic tangent are applied to the first four layers. The channel dimension for the first four layers is 512, and goes down to 80 in the final layer. The final conversion result is produced by adding the residual to the initial estimate.

The Spectrogram Inverter

A WaveNet vocoder, as introduced by Van Den Oord, et al., 2016, consists of four deconvolution layers. In this implementation, the frame rate of the mel-spectrogram is 62.5 Hz and the sampling rate of speech waveform is 16 kHz. So the deconvolution layers will upsample the spectrogram to match the sampling rate of the speech waveform. Then, a standard 40-layer WaveNet conditioning upon the upsampled spectrogram is applied to generate the speech waveform. The WaveNet vocoder was pretrained using the method described in Shen et al. (2018) on the VCTK corpus.

Figure 9:
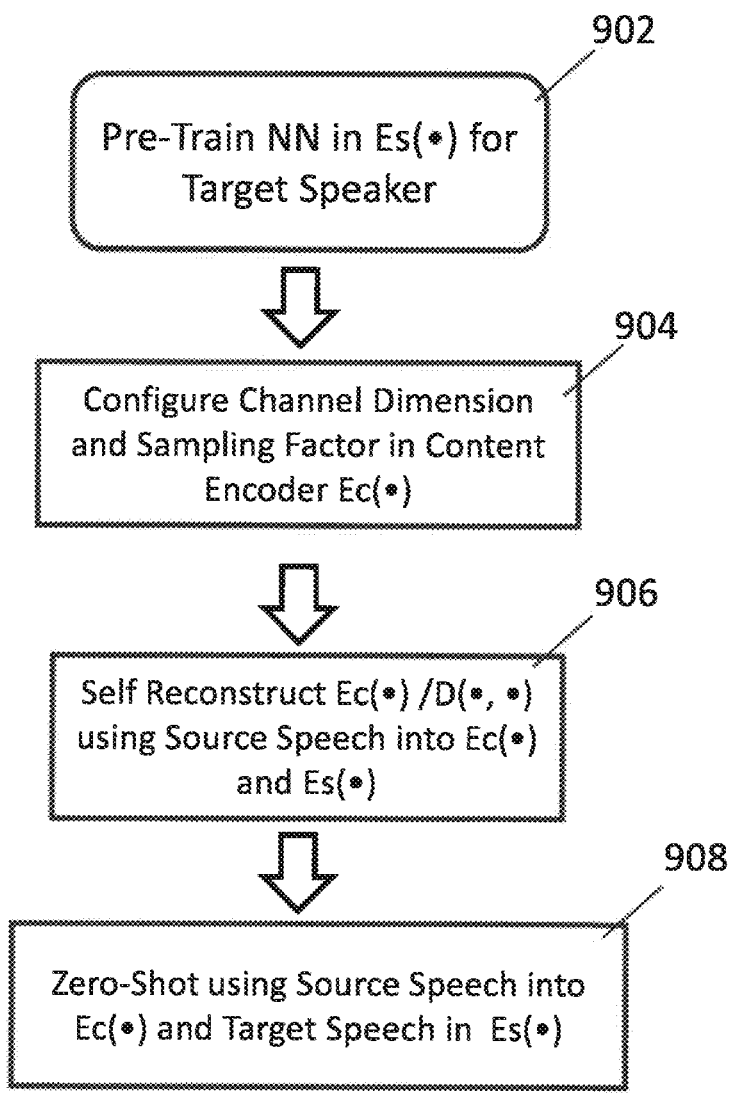
FIG. 9 shows a flowchart for implementing zero-shot process using the invention.

FIG. 9 shows a flowchart format 900 of the method used by the present invention to achieve zero-shot conversion. In step 902, the target speaker encoder is trained for the target speaker by training the neural network to maximize similarities among utterances of the same speaker and minimize similarities among those of other speakers.

In step 904, the bottleneck design is implemented in the content encoder and in step 906, the content encoder/decoder is trained using self-reconstruction in which source speech is used as input into the content encoder and the target speaker encoder. Once the self-reconstruction training is complete, in step 908, zero-shot conversion can now occur.

System Implementation

The present invention can be implemented in a number of various computer implementations, including a cloud service being offered which implements the AutoVC architecture. Therefore, although this disclosure includes a detailed description on cloud computing, as follows, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
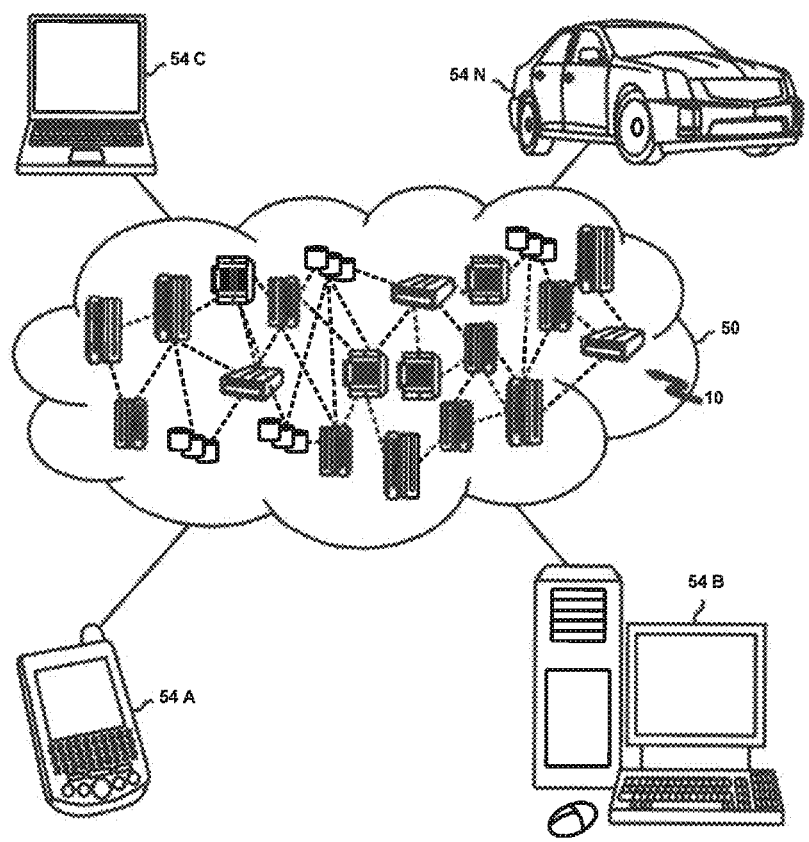
FIG. 10 shows a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
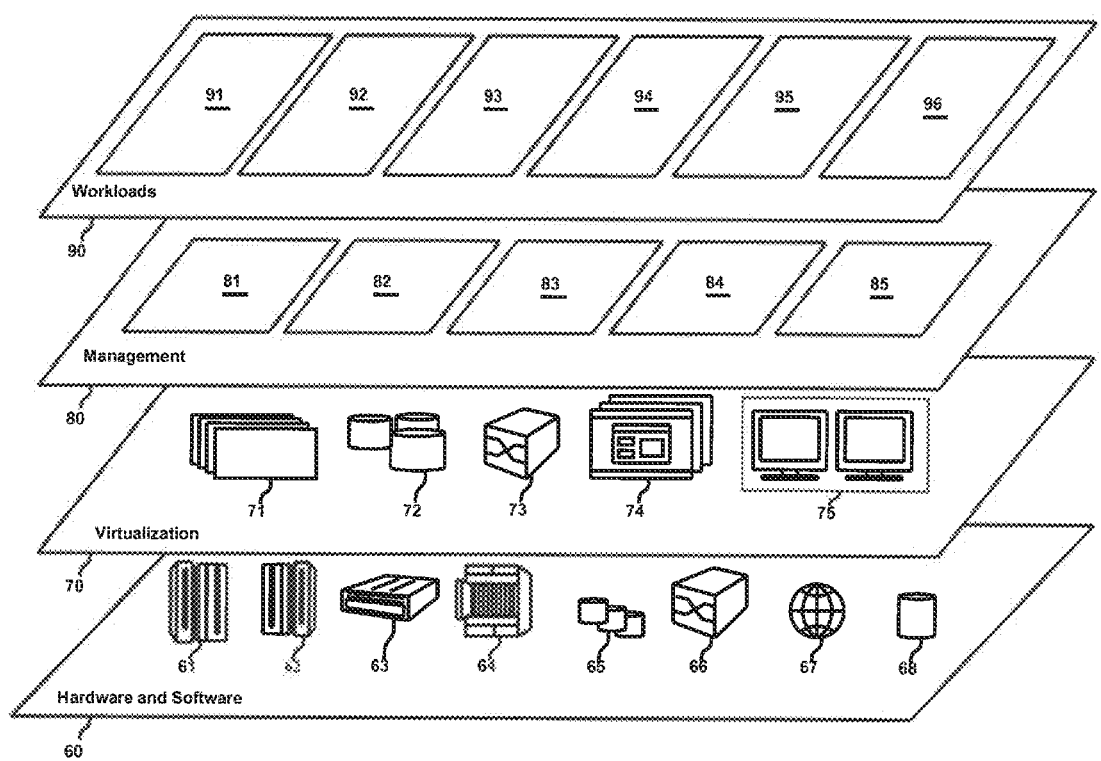
FIG. 11 depicts abstraction model layers according to an embodiment of the invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include tasks related to the implementation of the present invention in providing a AutoVC system capable of zero-shot voice conversion.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described in terms of several exemplary embodiments, those skilled in the art will recognize that the invention can be practiced with modification. Further, it is noted that, Applicants' intent is to encompass equivalents of all claim elements, even if amended later during prosecution.

What is claimed is:

1. A method of voice conversion capable of a zero-shot voice conversion with non-parallel data, the method comprising:
   receiving source speaker speech data as input data into a content encoder of a transfer autoencoder system, the content encoder providing a source speaker disentanglement of the source speaker speech data by reducing speaker related information of the input source speech data while retaining content information;
   receiving target speaker input speech as input data into a target speaker encoder; and
   combining an output of the content encoder and an output of the target speaker encoder as input data into a decoder of the transfer autoencoder, an output of the decoder providing the content information of the input source speaker speech data as adapted to the target speaker;
   wherein an information bottleneck in the transfer autoencoder system is constructed by a setting of parameters in a channel axis of the content encoder and in a temporal axis of the content encoder and of the decoder.

2. The method of claim 1, wherein the content encoder comprises a first neural network, the target speaker encoder comprises a second neural network, and the decoder comprises a third neural network, the method further comprising:
   initially pre-training the second neural network of the target speaker encoder using speech information of the target speaker; and
   subsequently training the first neural network of the content encoder in combination with the third neural network of the decoder in a self-reconstruction training wherein speech inputs from the source speaker are provided into the content encoder and into the target speaker encoder that has been pre-trained using target speaker speech information, the self-reconstruction training thereby training the combination of the content encoder and the decoder to adapt aspects of a style of the target speaker during a training mode of the transfer autoencoder system.

3. The method of claim 2, wherein the initial pre-training of the target speaker encoder comprises training a second neural network system to maximize an embedding similarity among different utterances of the target speaker and minimize similarities with utterances of other speakers, wherein the content encoder comprises a first neural network, the target speaker encoder comprises a second neural network, and the decoder comprises a third neural network, and wherein the content encoder is configured with parameter settings in a dimension axis or in a temporal axis.

4. The method of claim 1, wherein the source speaker disentanglement results from a predetermined design of the information bottleneck in the transfer autoencoder system,
further comprising setting parameters in a channel axis, by establishing a reduction of a channel dimension, and, in a temporal axis, by establishing a sampling timing factor.

5. The method of claim 4, wherein the information bottleneck is constructed by the setting of parameters in a channel axis of the content encoder and in a temporal axis of the content encoder and of the decoder.

6. The method of claim 5, wherein the setting of parameters comprises, in the channel axis, establishing a reduction of a channel dimension, and, in the temporal axis, establishing a sampling timing factor.

7. The method of claim 6, wherein the channel dimension is reduced from a dimension value at an input of a content decoder to a dimension value within a range of 32-64 and the sampling timing factor is set to a value in a range of 16-32.

8. The method of claim 1, as embodied in a set of machine-readable instructions implementing the transfer autoencoder system,
wherein the content encoder comprises a first neural network, the target speaker encoder comprises a second neural network, and the decoder comprises a third neural network, the method further comprising:
initially pre-training the second neural network of the target speaker encoder using speech information of the target speaker;
subsequently training the first neural network of the content encoder in combination with the third neural network of the decoder in a self-reconstruction training wherein speech inputs from the source speaker are provided into the content encoder and into the target speaker encoder that has been pre-trained using the target speaker speech information, the self-reconstruction training thereby training the combination of the content encoder and the decoder to adapt aspects of a style of the target speaker during a training mode of the transfer autoencoder system,
wherein the target speaker encoder is preliminarily trained to maximize embedding similarities among different utterances of the target speaker and minimize similarities with other speakers, and
wherein the combining of the output of the content encoder and the output of the target speaker encoder provides voice conversion of the zero-shot voice conversion with the non-parallel data, and
wherein a channel dimension is reduced from a dimension value at an input of a content decoder to a dimension value within a predetermined range and a sampling timing factor is set to a value in a second predetermined range.

9. The method of claim 8, as implemented on a server on a network.

10. A style transfer autoencoder system, comprising:
a processor; and
a memory accessible to the processor that stores machine-readable instructions permitting the processor to implement the style transfer autoencoder system as comprising:
a content encoder for receiving source speech information, the content encoder comprising a first neural network that is trainable;
a target speaker encoder for receiving target speaker speech information, the target speaker encoder comprising a second neural network that is trainable; and
a decoder receiving output data from the content encoder and output data from the target speaker encoder, the decoder providing as output speech information as comprising a content of a source speech utterance in a style of the target speaker, the decoder comprising a third neural network that is trainable,
wherein the content encoder is configured with parameter settings in a dimension axis and in a temporal axis so as to achieve a speaker disentanglement of the received source speech information, the speaker disentanglement meaning that a style aspect of a source speech utterance is limited by a bottleneck caused by the parameter settings, leaving a content aspect of the source speech utterance to be input data into the decoder,
wherein the parameter settings provide the bottleneck by a parameter setting in a channel axis that selectively reduces a channel dimension and by parameter setting in a temporal axis that selectively changes a sampling timing factor.

11. The style transfer autoencoder system of claim 10, wherein the channel dimension is reduced from a dimension value at an input of a content decoder to a dimension value within a range of 32-64 and the sampling timing factor is set to a value in a range of 16-32.

12. A method for transferring a style of voice utterances, as capable of a zero-shot voice conversion with non-parallel data, the method comprising:
preliminarily training a first neural network in a target speaker encoder, using speech information of a target speaker, the first neural network being trained to maximize an embedding similarity among different utterances of the target speaker and minimize similarities with other speakers;
operating an autoencoder system first in a training mode, the autoencoder system comprising a content encoder comprising a second neural network that compresses original input data from an input layer into a shorter code and a decoder comprising a third neural network that learns to un-compress the shorter code to closely match the original input data, the training mode comprising a self-reconstruction training using speech inputs from a source speaker into the content encoder and into the target speaker encoder that has been preliminarily trained using target speaker speech information, the self-reconstruction training thereby training the second neural network and the third neural network to adapt to a style of the target speaker; and
operating the autoencoder system in a conversion mode in which utterances of a source speaker provide source speech utterances in a style of the target speaker,
wherein the content encoder is configured to provide at least a source speaker disentanglement of input source speech data by reducing speaker style information of the input source speech data as a predetermined result of the configuring,
wherein the reducing of speaker style information results from a specifically-designed bottleneck implemented into a configuration of the autoencoder system, wherein an information bottleneck in a transfer autoencoder system is constructed by a setting of parameters in the content encoder and of the decoder, wherein the bottleneck results from a channel dimension reduction in a content decoder and a sample time setting in the autoencoder system.

13. The method of claim 12, wherein the channel dimension is reduced to a value within a range of 32-64 and the sample time setting is set to a value of 16-32.

\* \* \* \* \*